Figure 1:
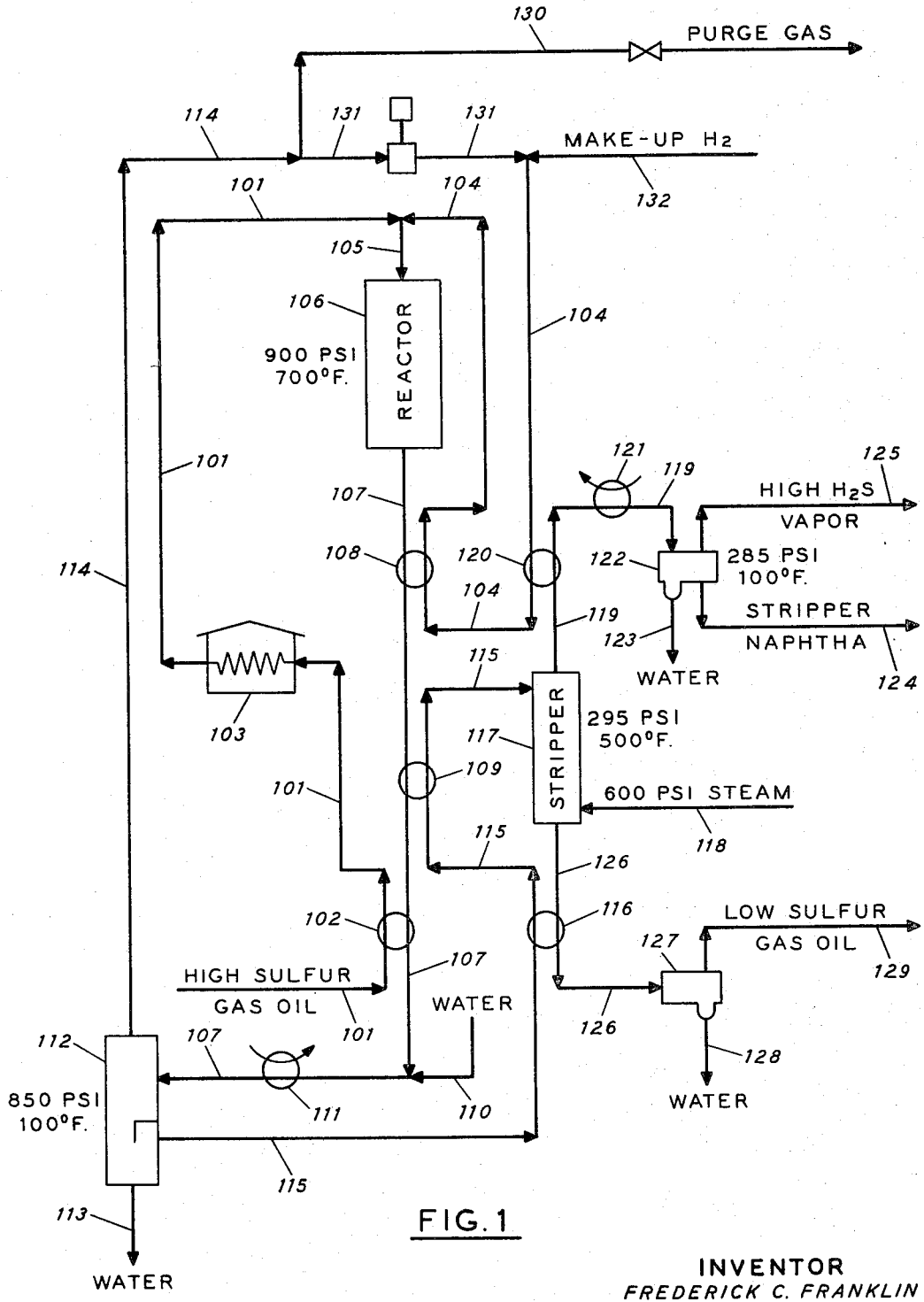

Dec. 5, 1967  F. C. FRANKLIN  3,356,608
HYDROTREATING PROCESS WITH H₂S REMOVAL FROM THE EFFLUENT
Filed Oct. 2, 1964  3 Sheets-Sheet 1

INVENTOR
FREDERICK C. FRANKLIN
BY
ATTORNEYS 3,356,608
HYDROTREATING PROCESS WITH H₂S
REMOVAL FROM THE EFFLUENT
Frederick C. Franklin, Pinole, Calif., assignor to Chevron Research Company, a corporation of Delaware
Filed Oct. 2, 1964, Ser. No. 401,021
9 Claims. (Cl. 208—212)

This invention relates to hydroconversion processes including hydrodesulfurization, and more particularly it relates to the treatment of hydroconversion process effluent streams for the separation of light hydrocarbons and gaseous by-products produced in the process.

In various hydroconversion processes oil and hydrogen are passed through a reaction zone at elevated temperature and pressure to contact a catalyst therein for the purpose of purifying the oil of various contaminants including sulfur and/or to convert the oil to lower-boiling or otherwise more valuable hydrocarbons. Generally, pressures of above 250 p.s.i.g. are used. When the oil feed contains sulfur compounds and a sulfactive hydrogenation catalyst is used for hydrotreating, there are produced $H_2S$ and at least a small amount of hydrocarbons which are lighter or lower boiling than the feed. Generally, if the feed is heavier than naphtha, the light hydrocarbon by-products will include the entire spectrum from hydrogen and methane through the naphtha boiling range. It is usually desired to separate from the hydrotreated oil these lighter by-products.

In the usual operation of such hydroconversion processes the effluent of the reaction zone is cooled to condense and separate as a liquid the hydrotreated oil, which at the pressures employed, will dissolve most and the $H_2S$ and hydrocarbons lighter than naphtha produced in the process. The oil thus condensed and separated is then distilled at a low pressure, generally less than 100 p.s.i.g., to take overhead the lighter materials and to recover as a bottoms stream the product boiling in the feed boiling range. The gases and light hydrocarbons so separated are then passed to a gas recovery process for the purpose of fractionating the light hydrocarbons and light naphthas into purified streams and removing the by-product $H_2S$ from the light hydrocarbons. Such gas recovery processes typically operate at pressures above 150 p.s.i.g. and usually at above 200 p.s.i.g.

It has thus been necessary to recompress the vapors from the initial distillation to pass them to the gas recovery process. Consequently, the processes as heretofore operated have required not only high investment for the initial distillation of the hydroconversion process effluent but also high investment for by-product vapor compression facilities. Further disadvantages are that the initial distillation facilities necessarily operate at the highest possible temperature to maximize operating pressure and thus to minimize compressor operating cost and product loss to by-products, which can result in undesired thermal cracking of the product, especially if product is fairly high boiling.

In accordance with the present invention the above problems are greatly alleviated or eliminated by stripping the liquid hydrotreated oil separated from the reaction effluent with steam at a high pressure whereby overhead vapors of the steam stripping can be condensed to separate the water and condensible naphtha boiling range hydrocarbons from vapor comprising $H_2S$ and uncondensed hydrocarbons generally lighter than naphtha. The vapor thus separated can then be flowed directly without compression to a gas recovery process, including a step for removal of $H_2S$, at a lower pressure above 150 p.s.i.g. Thus, no compression is reuqired of the vapors passed to the gas recovery process, and the operating costs associated therewith are eliminated. The steam stripping can be carried out at a lower temperature than would have to be used in the conventional distillation of the process effluent. The investment costs and operating costs of the steam stripper are substantially lower than for a distillation column to accomplish similar results.

The invention thus applies particularly in hydroconversion processes for treating sulfur-containing carbonaceous oils which are heavier than naphtha. I.e., the oils treated in accordance with the invention boil substantially above about 400° F. The invention is particularly useful, however, in conjunction with a hydroconversion process wherein naphtha boiling range hydrocarbons are also being hydrotreated. Naphtha boiling range hydrocarbons condensed from the overhead vapors of steam stripping the effluent of the hydroconversion process for treating the heavy oil are passed to a fractionation zone operated as a naphtha stabilizer along with the naphtha effluent of the naphtha boiling range hydroconversion process. The naphtha stabilizer is operable at a pressure above 200 p.s.i.g. because degradation of the naphtha at the temperatures required thereby is not a serious problem. Thus, there can be recovered from this stabilizer stabilized naphtha bottoms and a net overhead vapor stream comprising $H_2S$ and hdyrocarbons lower boiling than naphtha including such materlais as were contained in the naphtha boiling range material obtained from the high-boiling oil hydroconversion zone. The vapor stream thus obtained from the naphtha stabilizer can then be passed to the gas recovery process, also without compression.

In the description herein naphtha boiling range materials are considered to comprise pentane and hydrocarbons boiling up to about 400° F. Hydrocarbons heavier than naphtha are considered to be those boiling above about 400° F. It is to be appreciated that within materials boiling in the naphtha boiling range there will be minor amounts of butane and lighter hydrocarbons, and likewise that the end boiling point of naphtha is not critical and is a matter of choice rather than definition.

Figure 2:
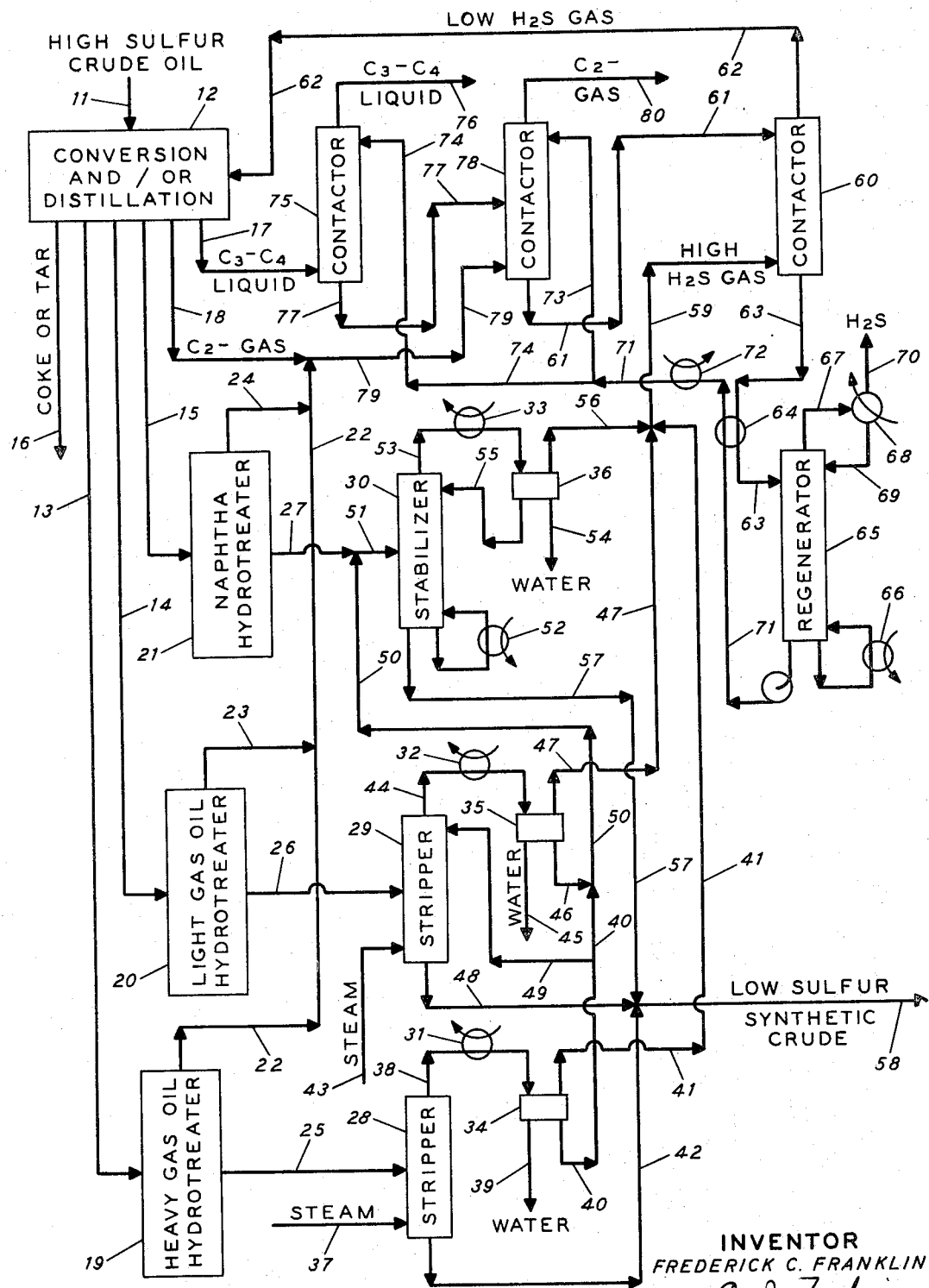
Figure 3:
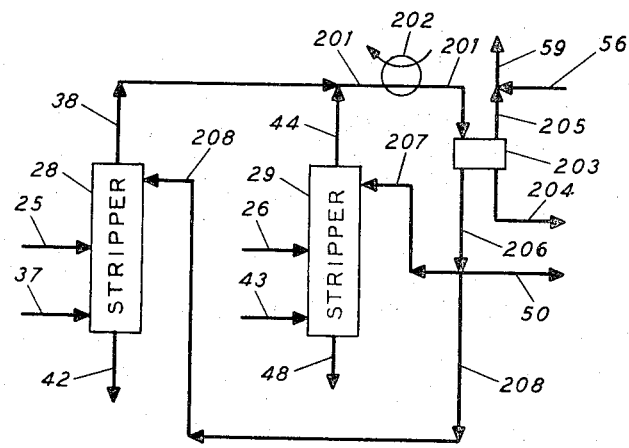
Figure 4:
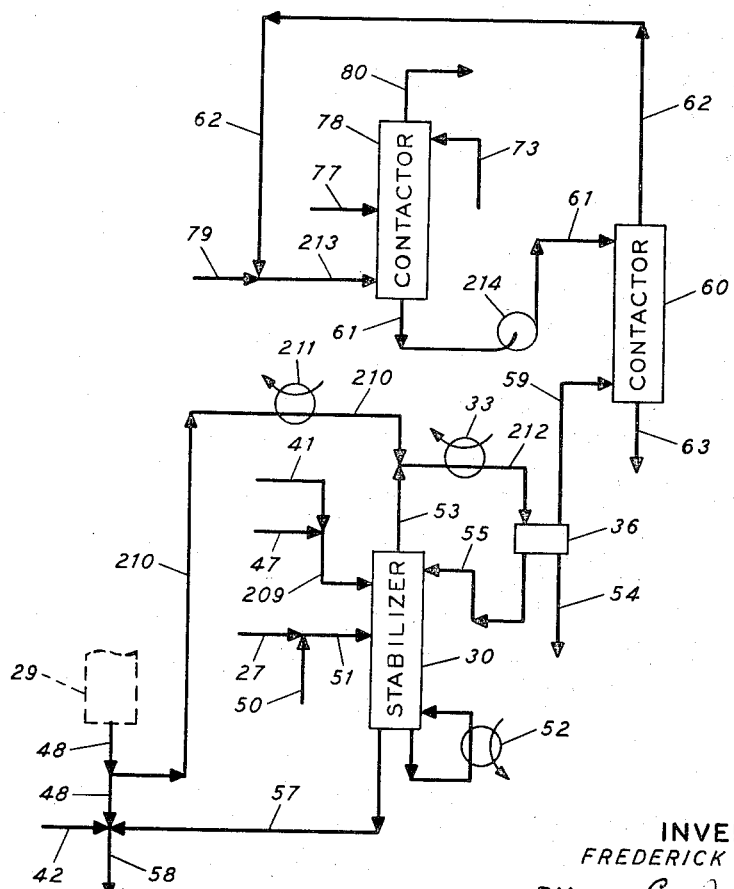

In the attached drawings, FIGURE 1 is a flow diagram schematically illustrating in some detail one manner in which the steam stripping of the present invention can be incorporated into a typical hydroconversion reaction process; FIGURE 2 is a flow diagram schematically illustrating one manner in which the present invention can be employed in a preferred embodiment comprising an integrated process arrangement for treating several hydrocarbon oils of different boiling ranges derived from a heavy oil to recover light hydrocarbons and $H_2S$; FIGURE 3 illustrates an alternate flow arrangement for operating in combination two steam strippers in the embodiment of FIGURE 2; and FIGURE 4 illustrates an alternate flow arrangement for operating in combination a steam stripper and a naphtha stabilizer in the embodiment of FIGURE 2.

Referring first to FIGURE 1, a high sulfur content gas oil boiling above the naphtha boiling range, in line 101, is preheated by passage through heat exchanger 102 and furnace 103, and then combined with preheated hydrogen-rich gas in line 104 to form a reactor feed in line 105. The oil and hydrogen pass through reactor 106 at elevated temperature and pressure to contact a sulfactive hydrogenation catalyst contained therein. Reaction conditions employed include temperatures of 400–900° F., pressures of 250–5000 p.s.i.g., and flow rates relative to the catalyst of from 0.1 to 20 volumes of normally liquid oil per volume of catalyst per hour (LHSV). Generally, the hydrogen throughput will be from 200 to 20,000 standard cubic feet per barrel of oil. More typical conditions are temperatures of 500–800° F. pressures of 500–3000 p.s.i.g., and space velocities of 0.3–5 LHSV, with 2000–10,000 s.c.f. hydrogen per barrel of oil.

Where the purpose of the hydroconversion is primarily to remove sulfur compounds from the oil, the catalyst employed in the reactor will be a sulfactive hydrogenation catalyst exemplified by the well-known cobalt molybdate catalyst. Thus, the catalysts useable comprise combinations of Group VI metals with Group VIII metals, their oxides or sulfides, supported on or associated with an inorganic refractory oxide support. Typical support materials are alumina, combinations of alumina and silica, silica-magnesia, zirconia, titania, etc.

In contact with such catalysts at the above-mentioned temperature and pressure conditions, sulfur compounds in the oil are hydrogenated to $H_2S$, and at least a small amount of low boiling hydrocarbons is produced. At conditions of high temperature and low space velocity substantial conversion to lower boiling materials may occur. Also, the amount of conversion will be greater with higher boiling feeds and with greater amounts of sulfur in the feed at any given degree of sulfur removal.

The reactor effluent in line 107 will accordingly comprise a mixture of hydrogen, $H_2S$, normally gaseous hydrocarbons, and normally liquid hydrocarbons. The effluent is cooled at the elevated pressure used in the reaction zone by passing through heat exchangers 108, 109, and 102. Water may be injected via line 110 to prevent plugging by deposits of solids formed by reaction of the by-products, and to wash such solids as ammonium chloride and ammonium bisulfide off the heat transfer surfaces in final water-cooled heat exchanger 111. The mixture of oil, gas, and water passes to separator 112 wherein the water is separated and withdrawn through line 113, and the uncondensed vapors comprising principally hydrogen are separated and withdrawn through line 114. At the elevated pressure and low temperature in separator 112 the bulk of the hydrocarbons lighter than naphtha will dissolve in the liquid hydrotreated oil which is withdrawn through line 115. Also, most of the $H_2S$ not dissolved in the water will dissolve in the oil at the temperature and pressure in the separator. The $H_2S$ is not very soluble in the water unless a large amount of $NH_3$ is present, in which case an ammonium bisulfide solution can be formed. The invention is particularly useful where the oil feed has a high sulfur content relative to nitrogen content and/or the nitrogen compounds are less completely converted to $NH_3$.

The major portion of the hydrogen-rich gas in line 114 is compressed in line 131 sufficient to enable recycling it to the reactor through line 104. Fresh makeup hydrogen is added to the recycled gas by line 132. A minor portion of the hydrogen-rich gas in line 114 is purged from the system via line 130 to prevent normally gaseous hydrocarbons from building up to excessively high partial pressures in the recycle hydrogen. The purged hydrogen-rich gas will thus contain normally gaseous hydrocarbons and the remainder of the $H_2S$ produced by hydrotreating and not dissolved in the water or oil.

In accordance with the invention the liquid hydrotreated oil in line 115 is passed to steam stripper 117, being first preheated in heat exchangers 116 and 109. The stripper operates at a lower pressure than the reactor and high pressure separator, but at a pressure above 200 p.s.i.g. and preferably above 250 p.s.i.g. High pressure steam is introduced through line 118 to carry overhead the $H_2S$ and light hydrocarbons via line 119, while the hydrocarbons boiling above the naphtha boiling range remain liquid and are withdrawn through line 126. The steam stripping rate is high, generally above 50 lbs. of steam per barrel at the high pressure, as compared to low steam rates of 10–40 lbs./bbl. used in low pressure stripping. The overhead vapors in line 119 are cooled in exchangers 120 and 121 to condense the steam and the bulk of the hydrocarbons therein boiling in the naphtha boiling range. The large amount of heat energy available at high temperature in the material in line 119 is thus advantageously recovered by heating cold process streams and/or generating steam. The mixture is collected in drum 122 where the condensed steam is separated and withdrawn through line 123, the uncondensed vapors of high $H_2S$ content are withdrawn through line 125, and a so-called stripper naphtha liquid stream is withdrawn through line 124. This stream is referred to as naphtha because it contains most of the naphtha boiling range material. It will also contain, however, appreciable amounts of butane and lighter hydrocarbons and also hydrocarbons boiling in the gas oil range. The stripped oil in line 126 is further cooled in exchanger 116 to reduce the solubility of water therein, and then passed to separator or coalescer 127, where the water can be withdrawn through line 128 and low sulfur content hydrotreated oil is recovered in line 129.

It will be observed that the injection of water via line 110 need not be continuous, but may be only intermittent as required to remove solid salt deposits from exchanger 111. Thus, the oil in line 116 may contain both $NH_3$ and $H_2S$. In prior art processes where such oil would be distilled, this would not be permissible because in a dry system the $NH_3$ and $H_2S$ would recombine to form solid ammonium bisulfide plugging the overhead vapor line and/or overhead condenser. In the present invention, wherein steam stripping is employed, the ammonia and $H_2S$ will be prevented from forming as a solid, instead dissolving in the water withdrawn from separator 122 through line 123.

The operating conditions shown on FIGURE 2 are typical for treatment of a light gas oil, as in the following example illustrating the manner in which the invention can be employed in working up the effluent of hydrotreating such an oil, and the results which can be expected.

*Example 1*

A light coker gas oil boiling from 400° F. to 650° F., containing 4.3 weight percent sulfur and having a gravity of 22° API, is passed with 3000 standard cubic feet of hydrogen per barrel of oil through a reactor containing a 3% cobalt-7% molybdenum on alumina sulfided catalyst at 700° F., 900 p.s.i.g., and 1.0 LHSV. The effluent of the reactor is cooled to 100° F. at 850 p.s.i.g. whereupon it separates into a high pressure gas amounting to 2500 s.c.f. per barrel of oil and containing 3.8 mol percent $H_2S$, and an oil portion containing 0.4 weight percent organic sulfur, 3.7 weight percent dissolved $H_2S$, 4 weight percent hydrocarbons having 4 or less carbon atoms to the molecule, 6 weight percent hydrocarbons boiling in the naphtha range of pentane—400° F., and the remainder oil boiling in the feed boiling range. Of the high pressure gas, about 4% is purged from the system to limit the buildup of $H_2S$ and normally gaseous hydrocarbons in the recycle hydrogen. This is a relatively minor amount such that the $H_2S$ dissolved in the oil represents the predominant portion of the $H_2S$ produced. The oil is passed to a stripping column operated at 295 p.s.i.g. and 500° F. wherein it is countercurrently contacted with 226 pounds of high pressure steam per 1000 pounds of effluent oil. The stripper overhead vapors are condensed at 100° F. and 285 p.s.i.g. and the condensed water drawn off. The uncondensed vapors comprise 73 mol percent $H_2S$, and contain 70% of the hydrocarbons having 4 or less carbon atoms to the molecule which were contained in the stripper feed, and contain only 1% of the naphtha boiling range materials. The stripper naphtha condensed overhead of the stripper contains 54% of the naphtha boiling range material in the stripper feed and the remaining 30% of the light hydrocarbons having 4 or less carbon atoms to the molecule, and contains 15 weight percent $H_2S$ and less than one weight percent water. The product hydrotreated gas oil recovered from the bottoms of the steam stripper is essentially free of $H_2S$. Although 45% of the naphtha boiling range materials produced are left in the hydrotreated stripped oil, between 96% and 97% of the stripped hydrotreated product boils between 400 and 650° F. After further cooling and passing through a coalescer, the oil contains less than 0.15 weight percent water.

Referring now to FIGURE 2, the manner in which the invention may be employed in an integrated processing scheme for removing sulfur from a high sulfur crude oil to produce a low sulfur content synthetic crude oil will be described by way of example. This particular arrangement is particularly suited for use in remote areas near the source of the crude to improve the pipeline transportability of the crude and its marketability. In particular, it is desired to transport only clean oil, and not sulfur, to refineries in more populated areas for conversion and recovery of ultimate consumer products.

In FIGURE 2 a high sulfur content crude oil in line 11 is passed to conversion and/or distillation zone 12. Zone 12 may represent simply conventional atmospheric and/or vacuum distillation of the oil into fractions including heavy gas oil in line 13, light gas oil in line 14, and naphtha boiling range material in line 15. In addition, there will be obtained a heavy residual oil or tar in line 16, light hydrocarbons such as propane and butane in line 17, and normally gaseous hydrocarbons in line 18. More typically, the oil will be converted in zone 12 as by coking, residuum stripping, thermal cracking, solvent extraction, or like processes, and the materials so produced will then be distilled into the above-mentioned fractions. In the case where coking is used, there will be obtained a solid coke in line 16. Also, where any conversion process is employed, the amount of normally gaseous material in line 18 and of propane-butane in line 17 will be materially increased. The distillation in zone 12 includes a high pressure distillation of the light by-products such that the propane-butane is recovered as a liquid stream, and accordingly the pressure at which this stream is supplied will usually be about 150 p.s.i.g., or at any rate above about 100 p.s.i.g. Because a great number and variety of conversion processes can suitably be used in zone 12 and because the manner of distilling the crude oil or products of such conversion is conventional though subject to many alternate arrangements, this portion of the process is represented simply as a box, the manner of operation therein not being a novel part of the invention.

In accordance with the invention, the heavy gas oil in line 13, the light gas oil in line 14, and the naphtha in line 15 are passed respectively to hydrotreating zones 19, 20, and 21. Each of the hydrotreating zones shown by the boxes may comprise a unit as illustrated in FIGURE 1, excluding the steam stripper and its associated equipment, already discussed. Operating conditions employed in the respective hydrotreating zones, however, may be different. In particular, a higher pressure will usually be used with the higher boiling oil. From each hydrotreating zone, there will accordingly be obtained a low $H_2S$ content purge gas from the hydrogen recycle streams, in lines 22, 23, and 24. Similarly, from each hydrotreating zone there will be obtained a liquid hydrotreated oil stream containing dissolved $H_2S$ and light hydrocarbons in lines 25, 26, and 27.

It is found that treating the different oils separately in this way is much superior to hydrotreating a broad boiling range blend in a single unit, as conditions appropriate for each oil can be used. If blended together, the properties of the heavy oil would be controlling, so that the lighter oils would be unnecessarily overtreated.

The hydrotreated heavy gas oil in line 25 is passed to stripper 28 wherein it is stripped with high pressure steam introduced via line 37, at a pressure which is lower than the pressure used in hydrotreater 19 but above 200 p.s.i.g. and preferably above 250 p.s.i.g. Similarly, the hydrotreated light gas oil in line 26 is stripped in stripper 29 with steam introduced through line 43 at similar pressure conditions. Strippers 28 and 29 are each provided respectively with overhead condensers 31 and 32 and receivers 34 and 35. The overhead vapors of stripper 28 in line 38, comprising $H_2S$, normally gaseous hydrocarbons, naphtha boiling range hydrocarbons, and steam are cooled in condenser 31 and passed to receiver 34 wherein the condensed water is withdrawn through line 39. As in FIGURE 1 a portion of the heat removed by condenser 31 may typically be recovered by generating lower pressure steam or by suitable exchange with cold process streams. The stripper naphtha is withdrawn through line 40 and a high $H_2S$ content vapor is withdrawn through line 41. A portion of the stripper naphtha in line 40 may be diverted through line 49 to serve as reflux in stripper 29 associated with stripping the hydrotreated light gas oil. The overhead vapors in line 44 will then contain not only the $H_2S$ and light hydrocarbons derived from the light gas oil, but also a portion of such materials as were contained in the material in line 49. In this case, stripper 28 can be operated in such a manner as to carry overhead some of the light gas oil produced in hydrotreater 19 which would otherwise contaminate the product in line 42. This light gas oil, by entering the light gas oil stripper through line 49, can then be recovered with the stripped hydrotreated light gas oil in line 48. As in the case of condenser 31, a portion of the heat removed in condenser 32 may typically be recovered. The water condensed from the overhead vapors of stripper 29 are collected in receiver 35 and withdrawn through line 45. The stripper naphtha is withdrawn through line 46 and combined with any portion of the stripper naphtha from stripper 28 which was not introduced into stripper 29, to form a combined stream in line 50. Uncondensed hydrocarbons and $H_2S$ are withdrawn from overhead separator 35 in line 47.

The hydrotreated naphtha in line 27 is combined with the stripper naphtha in line 50, and the combined streams are passed via line 51 to distillation column 30, which is operated as a naphtha stabilizer at a lower pressure than used in the naphtha hydrotreating but at least 200 p.s.i.g. In the naphtha stabilizer steam stripping is not used, the heat instead being supplied by reboiler 52 to generate overhead vapors in line 53 which are partially condensed in condenser 33. The condensed material is separated from uncondensed gas in separator 36. A small amount of water entrained with the material in lines 27 and 50 may be withdrawn through line 54. The remainder of the condensed naphtha overhead is utilized as reflux through line 55. The bottoms of stabilizer 30 is thus a stabilized naphtha in line 57. A cleaner separation between naphtha and lighter hydrocarbons is obtained in the distillation than is obtainable in the simple steam stripping of the heavy gas oil and light gas oil hydrotreater effluents. Hence, the uncondensed vapor in line 56 will contain much less naphtha boiling range materials than the vapors of lines 41 and 47.

The high $H_2S$ content vapors in lines 41, 47, and 56 are combined as a high $H_2S$ gas stream in line 59 and flowed directly to absorber 60 without compression. Thus, the pressure in steam strippers 28 and 29 is set by that needed to pass the gases directly to the absorber. Usually, this pressure will not be above 400 p.s.i.g. and hence will be in a range where steam stripping is economical in spite of the high steam rate used. In absorber 60 the gases are contacted with partially spent absorbent for $H_2S$, such as alkanolamine solution or an aqueous alkali metal carbonate solution, introduced through line 61. The gases are not completely purified in this absorber, but there is obtained overhead a lower $H_2S$ content gas in line 62. This gas will contain not only normally gaseous hydrocarbons but also some propane and butane. Accordingly, it is returned to the high pressure distillation section in zone 12 wherein it is combined with the other streams undergoing distillation so that the propane and butane therein appear in line 17, and the normally gaseous hydrocarbons therein appear in line 18.

In this particular embodiment a gas recovery arrangement can be employed wherein the propane-butane liquid in line 17 is first purified of its $H_2S$ content by countercurrent contacting in absorber 75 with fresh regenerated lean absorbent solution introduced via line 74. The $C_3$–$C_4$ liquid product thus obtained overhead in line 76 is essentially free of H₂S, and a partially spent absorbent solution is obtained in line 77. This solution can be passed as shown to an intermediate location in absorber 78. Absorber 78 is used to purify the low H₂S content normally gaseous stream comprising materials obtained in line 18 by distillation of the feed or conversion products and of the low H₂S gas in line 62, combined with the high pressure purge gases of lines 22, 23, and 24. Thus a combined low H₂S content gas in line 79 is passed to absorber 78 wherein it is contacted first with the partially spent absorbent introduced via line 77 and then, on passing further up the column, contacts freshly regenerated lean absorbing solution introduced through line 73. The overhead gas in line 80 is thus essentially free of H₂S, and there is obtained a partly spent absorbing solution in line 61. This partially spent solution is then used in the absorption in absorber 60. Rich spent absorbing solution in line 63 is passed to regenerator 65, being heated en route in exchanger 64. In a conventional manner, the solution is regenerated by boiling by means of reboiler 66 to drive H₂S overhead through line 67. Any entrained solution is recovered by condenser 68 and returned to the column through line 69, so that substantially pure H₂S can be recovered in line 70. The regenerated solution obtained in line 71 is cooled by passage through exchangers 64 and 72, and then reused in absorbers 75 and 78 by passing through lines 73 and 74.

Distinct advantages are obtained by the above processing scheme for recovery of H₂S in conjunction with the steam stripping of the hydrotreater effluents to obtain the high H₂S content gas. For example, whereas a much larger absorber would be required to completely purify the high H₂S content gas in a single step, by using partially spent absorbing solution and only partly removing the H₂S in a first step in absorber 60 a smaller absorber is required for this gas stream and in some cases less total circulation of absorbing solution can be used for recovering H₂S from all the H₂S containing streams. Because the high H₂S content gases are provided at a high pressure, the partially purified gas can be led directly to the distillation section in zone 12 for separation into $C_3$–$C_4$ liquid and a normally gaseous stream in conjunction with streams of similar composition. Both of the resulting streams (17 and 18) can be relatively easily purified in smaller separate units than typically required with the favorably low H₂S concentration in the effluent absorbent solution which is obtained by the process arrangement, and the partially spent effluent absorbent solution is ideally suited for use in absorber 60.

In the embodiment illustrated the hydrotreated heavy gas oil in line 42, the hydrotreated light gas oil in line 48, and the hydrotreated naphtha in line 57 are combined to form a low sulfur light synthetic crude oil in line 58 for transport to other refineries where individual products can be recovered. Since the hydrotreated oils are to be combined, there is no point in attempting to obtain clean separations in strippers 28 and 29 between the gas oils and naphtha. It is important, however, to be sure that all H₂S and hydrocarbons lighter than naphtha are stripped out, even at the expense of including gas oils in the stripper naphthas passed to the stabilizer. Maximum recovery of the light hydrocarbons is desired where the integrated unit is in a remote location, as they can be used to supply essentially all energy requirements. Thus, the liquid propane-butane product may be used as fuel, and the normally gaseous hydrocarbons stream may be steam reformed to supply H₂ for the hydrotreating units. Treatment of the hydrotreater effluent stream is accordance with the invention is ideally suited for this situation besides being substantially more economical than conventional methods.

The following example presents a material balance worked up to illustrate the cooperative interactions of the various units in the invention when used as in FIGURE 2, and is representative of the type of operation which could advantageously be used in a remote region near the crude source.

*Example 2*

A high sulfur crude oil is recovered from tar sands by known aqueous extraction methods. The oil has a gravity of 10° API and contains 5.3% sulfur, and about two-thirds boils above 950° F. By thermal coking in zone 12 about 2% of the tar sands crude oil is converted to butane and lighter hydrocarbons, about 19% is converted to coker naphtha boiling up to 400° F., about 35% is converted to light coker gas oil boiling from 400° F. to 650° F., about 25% is converted to heavy coker gas oil boiling from 650° F. to 950° F., and about 19% is converted to coke and tarry materials boiling above 950° F.

The heavy coker gas oil, containing 4.7 weight percent sulfur, is hydrotreated in zone 19 at about 730° F. and 1500 p.s.i.g., and conditions otherwise the same as described in the previous example of treating light gas oil. Gas withdrawn from the hydrogen recycle amounts to 78 s.c.f. per barrel and contains 2.8 mol percent H₂S. By stripping at about 300 p.s.i.g. with about 75 pounds of steam per barrel the hydrotreater effluent is separated into 170 s.c.f./bbl. of gas which is 69 mol percent H₂S; 9.6% yield of 41.3° API stripper naphtha containing 14 weight percent H₂S; and 93% yield of 17.8° API stripper bottoms containing 0.5 weight percent sulfur. The bottoms boil 90% above 650° F. though it contains 79% of the light gas oil and 15% of the naphtha produced in the hydrotreating.

The light coker gas oil is hydrotreated in zone 20 in the same manner as in Example 1, and the same product distribution is obtained in the steam stripping. In this example none of the stripper naphtha derived from the heavy gas oil is passed to the light gas oil stripper. Instead, the stripper naphthas are combined and passed to the naphtha stabilizer.

The coker naphtha, containing 1.9 weight percent sulfur, is hydrotreated in zone 21 at about 700° F. and 600 p.s.i.g. The purge gas from the hydrogen recycle is 90 s.c.f./bbl. of naphtha and contains 2.5% H₂S. The effluent hydrotreated naphtha is passed along with the stripper naphthas to a distillation column operated at 250 p.s.i.g. Per barrel of coker naphtha feed to the stabilizer there is obtained from the column 300 s.c.f. of net vapor product which is 63 mol percent H₂S, including normally gaseous hydrocarbons and H₂S which were dissolved in the stripper naphthas obtained from the hydrotreated gas oils. The bottoms naphtha product obtained in 120% yield (including the stripper naphthas) from coker naphtha has a gravity of 49.9° API and contains 0.05 weight percent sulfur. This stream comprises 89% $C_5$– 400° F. materials and 10% 400–650° F. gas oil, and 1% boils above 650° F.

The high H₂S content gases obtained from the strippers and stabilizer amount to 144 s.c.f. per barrel of crude. They pass directly to a contacting column at above 200 p.s.i.g. for scrubbing with 800 barrels per million cubic feet of gas of an aqueous solution of 20% diethanolamine partially spent to an H₂S content of 1.2%. The H₂S content of the gas is lowered from 68 mol percent to 10 mol percent. The partially purified gas is 20% $C_5+$, 40% $C_3$–$C_4$, and 25% $C_1$–$C_2$ hydrocarbons, by weight, the balance being H₂ and H₂S. When this is distilled with the light coker products, there are obtained a liquid $C_3$–$C_4$ cut containing 3.6% sulfur and a $C_2$ minus gas containing 12.6 mol percent H₂S in yields, respectively, of 6.7% from crude and 420 s.c.f./bbl. of crude. The H₂S content of the $C_3$–$C_4$ cut is lowered to 500 p.p.m. by contacting with 15% of the fresh regenerated amine solution. The propane-butane product still contains above 3 weight percent sulfur, as organic sulfur compounds (mercaptans). If a sulfur-free product is desired, the mercaptans may be extracted by means of any of the well-known processes available. The mercaptans may be utilized as a purified product, or may be desulfurized to recover additional propane, butane and H₂S by combining with the coker naphtha to zone 21.

The $C_2$ minus gas is combined with the hydrotreater purge gases and then contacted with the spent amine solution from the $C_3$–$C_4$ contacting and with the balance of the fresh regenerated amine solution, yielding 440 s.c.f. of gas containing 0.1% $H_2S$, per barrel of crude, and the partially spent amine used for scrubbing the high $H_2S$ content gas.

Referring now to FIGURE 3 there shown is another way in which the overhead vapors of steam strippers 28 and 29 of FIGURE 2 may be handled. Streams shown in FIGURE 2 are represented by the same reference numerals in FIGURE 3 to indicate the manner of incorporating this embodiment into the overall process. As shown, the stripper overhead vapors in lines 38 and 44 are combined in line 201, cooled in condenser 202, and collected in receiver 203. Water withdrawn through line 204 thus includes the steam injected at 37 and at 43. Uncondensed vapors in line 205 include vapors which (in FIGURE 2) were separately obtained in lines 41 and 47, and combine with naphtha stabilizer gas in line 56 to form the high $H_2S$ content gas of line 59 as before. A portion of the condensed stripper naphthas in line 206, representing the net production thereof, is withdrawn through line 50 for passing to the naphtha stabilizer as before. Another portion may be refluxed to stripper 29 via line 207, and/or another portion may be refluxed to stripper 28 via line 208.

This arrangement is advantageous in using a common overhead vapor condensing unit while permitting using different steam rates for stripping the different gas oils. Also, for example, the heavier gas oil can be more completely stripped of hydrocarbons boiling below its desired boiling range, and heavy hydrocarbons thereby introduced into receiver 203 can act as a scrubbing oil to help minimize any loss of naphtha boiling range hydrocarbons in the uncondensed vapors of line 205. The same equipment arrangement can instead be used to accomplish the opposite objective of eliminating naphtha from a light gas oil product to be recovered in line 48 by using more steam in stripper 29 and refluxing stripper naphtha containing light gas oil to the heavy gas oil stripper 28.

Referring now to FIGURE 4, alternate methods of combining the high $H_2S$ content gas derived from the strippers with that obtained from the stabilizer, for passing to the recovery section, are shown in relation to streams and units identified by reference numerals the same as in FIGURE 2 to indicate the manner of incorporating therein. The arrangement shown in FIGURE 4 is particularly useful where the naphtha and gas oil streams are to be combined for transport such that close separations are not needed, but it is desired to recover all normally liquid hydrocarbons. As shown, the high $H_2S$ content stripper gasses in lines 41 and 47 are combined in line 209 and introduced into stabilizer 30 above the point of introducing naphtha by line 51. The small amount of naphtha boiling range hydrocarbons contained in these gases thus has an opportunity to work its way down the column and be recovered. Also, a minor portion of the light gas oil in line 48 may be diverted via line 210, cooled in exchanger 211, and combined with the stabilizer overhead vapors of line 53 to form a combined stream in line 212. Besides helping to condense the condensible portion of the vapors, completed in condenser 33, the light gas oil acts as a sponge or absorbing oil for light components. Thus essentially all of the naphtha and most of the butane is taken into the liquid phase and refluxed via line 55 for ultimate recovery out the bottom of stabilizer 30 in line 57. The uncondensed $H_2S$ rich gas in line 59 will then be of lower molecular weight than described in Example 2 herein. Accordingly, after treating in absorber 60, the partially purified gas in line 62 can be combined directly with the low $H_2S$ content gases of line 79 and passed via line 213 to absorber 78, instead of being returned to distillation zone 12. Pump 214 will then be needed in line 61 to pass the partially spent absorbing solution from absorber 78 to absorber 60, unless the former is located at a sufficiently higher elevation than the latter for gravity flow. In conjunction with this embodiment it will generally be found desirable to alter the distillation in zone 12 so as to include all or most of the butane in the naphtha to be hydrotreated, for recovery in the hydrotreated naphtha and synthetic light crude blend. Going a step further, the recovery of a separate propane or propane-butane cut may be eliminated, and propane be included in the light gas cut.

While specific examples and embodiments have been described herein, it will be recognized that the invention as defined in the appended claims can be used in other embodiments for similar purposes, and accordingly such uses as fall within the claims are intended to be embraced thereby. In particular, it will be noted that the precise manner of carrying out the hydrotreating is not critical, and need not be as in FIGURE 2, provided that there is obtained at elevated pressure liquid hydrotreated oil containing dissolved light hydrocarbons. Also, where individual hydrotreated products are to be recovered, instead of blending into a single product as in FIGURE 2, stripper naphtha can be refluxed to the steam stripping zones to minimize the amount of gas oil boiling range material passed to the naphtha stabilizer.

I claim:

1. In a process for hydrotreating a sulfur-containing carbonaceous oil heavier than naphtha, wherein said oil and hydrogen are passed at elevated temperature through a hydroconversion zone containing a sulfactive hydrogenation catalyst at a pressure above 250 p.s.i.g. whereby there are produced $H_2S$ and hydrocarbons lighter than naphtha desired to be recovered separately from hydrotreated oil heavier than naphtha, and wherein from the effluent of the hydroconversion zone there is separated under conditions including a pressure above 250 p.s.i.g. to obtain a liquid hydrotreated oil having dissolved therein most of the $H_2S$ and hydrocarbons lighter than naphtha, the improvement of separating without compression said liquid hydrotreated oil into $H_2S$ and relatively low sulfur content hydrotreated oil lighter than naphtha, naphtha and hydrocarbons heavier than naphtha, which comprises:

passing liquid hydrotreated oil so separated to a stripping zone and therein stripping with steam at a lower pressure above 200 p.s.i.g. to obtain bottoms stripped hydrotreated oil and overhead vapors comprising steam, $H_2S$, naphtha, and hydrocarbons lighter than naphtha;

cooling the overhead vapors to condense and separate water and naphtha boiling range hydrocarbons from vapor comprising $H_2S$ and uncondensed hydrocarbons lighter than naphtha at a lower pressure above 200 p.s.i.g.;

and flowing the separated vapor, without compression, to a gas recovery process including a step for removal of $H_2S$ at a lower pressure above 150 p.s.i.g., to recover separately $H_2S$ and relatively low $H_2S$ content hydrocarbons lighter than naphtha.

2. The process which comprises:

(1) hydrotreating a sulfur-containing oil heavier than naphtha in a first hydroconversion zone at a pressure above 250 p.s.i.g., and hydrotreating a sulfur-containing naphtha boiling range oil in a second hydroconversion zone at a pressure above 250 p.s.i.g.;

(2) separating from the effluent of each hydroconversion zone under conditions including pressures above 250 p.s.i.g. to obtain a liquid hydrotreated oil having dissolved therein most of the $H_2S$ and hydrocarbons lighter than naphtha;

(3) stripping the liquid hydrotreated oil so separated from the first hydroconversion zone in a stripping zone with steam at a lower pressure above 200 p.s.i.g. to obtain stripped liquid hydrotreated oil and overhead vapors comprising steam, $H_2S$, naphtha, and hydrocarbons lighter than naphtha, and cooling the overhead vapors to condense and separate water and naphtha boiling range hydrocarbons from vapor comprising $H_2S$ and uncondensed hydrocarbons lighter than naphtha;

(4) distilling liquid hydrotreated naphtha so separated from the second hydroconversion zone in a fractionation zone operated as a naphtha stabilizer with overhead condensation and reflux at a pressure above 200 p.s.i.g. to obtain stabilized naphtha bottoms and a net overhead vapor stream comprising $H_2S$ and hydrocarbons lighter than naphtha;

(5) passing at least a portion of the condensed naphtha obtained overhead from the steam stripping zone to the naphtha stabilizer, whereby naphtha so passed can be recovered in the stabilized naphtha and $H_2S$ and hydrocarbons lighter than naphtha contained in the naphtha so passed are included in the net overhead vapors of the stabilizer; and (6) flowing the vapors comprising $H_2S$ and hydrocarbons lighter than naphtha without compression to a gas recovery process including a step for removal of $H_2S$ at a lower pressure above 150 p.s.i.g., to recover separately $H_2S$ and relatively low $H_2S$ content hydrocarbons lighter than naphtha.

3. The process of claim 2 wherein the vapors comprising $H_2S$ and uncondensed hydrocarbons lighter than naphtha obtained from the steam stripping zone are combined with the net overhead vapors comprising $H_2S$ and hydrocarbons lighter than naphtha obtained from the naphtha stabilizer, and the combined vapors are flowed directly to the gas recovery process.

4. The process of claim 2 wherein the vapors comprising $H_2S$ and uncondensed hydrocarbons lighter than naphtha obtained from the steam stripping zone are passed to the naphtha stabilizer whereby $H_2S$ and light hydrocarbons contained therein are recovered with the net overhead vapors comprising $H_2S$ and hydrocarbons lighter than naphtha obtained from the stabilizer.

5. The process of claim 2 wherein a portion of the stripped liquid hydrotreated oil is introduced into the naphtha stabilizer overhead and thereby introduced into the naphtha stabilizer as reflux, and the stabilized naphtha bottoms is combined with another portion of the stripped hydrotreated oil to form a light synthetic crude product.

6. The process of claim 5 wherein vapors comprising $H_2S$ and uncondensed hydrocarbons lighter than naphtha obtained from the steam stripping zone are also introduced into the naphtha stabilizer, wherein the naphtha boiling range oil fed to the second hydroconversion zone includes butane, and wherein the operation of the naphtha stabilizer is controlled to include butane in the stabilized bottoms.

7. The process which comprises:

(1) hydrotreating a first sulfur-containing oil heavier than naphtha in a first hydroconversion zone at a pressure above 250 p.s.i.g., hydrotreating a second sulfur-containing oil heavier than naphtha but lighter than said first oil in a second hydroconversion zone at a pressure above 250 p.s.i.g., and hydrotreating a sulfur-containing naphtha in a third hydroconversion zone at a pressure above 250 p.s.i.g.;

(2) separately separating from the effluent of each hydroconversion zone under conditions including pressures above 250 p.s.i.g. to obtain a liquid hydrotreated oil having dissolved therein most of the $H_2S$ and hydrocarbons lighter than naphtha;

(3) passing the liquid hydrotreated oils so separated from the first and second hydroconversion zones to separate first and second stripping zones, respectively, and therein stripping with steam at lower pressures above 200 p.s.i.g. to obtain from each stripping zone stripped liquid hydrotreated oil and overhead vapors comprising steam, $H_2S$, naphtha, and hydrocarbons lighter than naphtha;

(4) passing the liquid hydrotreated oil from the third hydroconversion zone to a distillation zone operated as a naphtha stabilizer with overhead condensation and reflux at a lower pressure above 200 p.s.i.g. to obtain stabilized hydrotreated naphtha bottoms and net overhead vapors comprising $H_2S$ and hydrocarbons lighter than naphtha;

(5) cooling the overhead vapors of said stripping zones to condense and separate water and naphtha boiling range hydrocarbons from vapor comprising $H_2S$ and uncondensed hydrocarbons lighter than naphtha;

(6) passing condensed naphtha boiling range hydrocarbons obtained from the first and second stripping zones to the naphtha stabilizer; and (7) flowing the vapors comprising $H_2S$ and hydrocarbons lighter than naphtha, without compression, to a gas recovery process including a step for removal of $H_2S$ at a lower pressure above 150 p.s.i.g., to recover separately $H_2S$ and relatively low $H_2S$ content hydrocarbons lighter than naphtha.

8. The process of claim 7 wherein the overhead vapors of the steam stripping zones are combined and then cooled to condense and separate water and naphtha boiling range hydrocarbons from vapor comprising $H_2S$ and uncondensed hydrocarbons lighter than naphtha, and a portion of the naphtha boiling range hydrocarbons so condensed is returned to at least one of the steam stripping zones as reflux thereto.

9. The process of claim 7 wherein the overhead vapors of said steam stripping zones are separately cooled to condense and separate naphtha boiling range hydrocarbons, and at least a portion of the condensed naphtha obtained overhead from the first stripping zone is passed to the second stripping zone.

References Cited

UNITED STATES PATENTS

| | | | |
|---|---|---|---|
| 2,840,513 | 6/1958 | Nathan | 208—216 |
| 3,003,953 | 10/1961 | Evans | 208—212 |
| 3,011,971 | 12/1961 | Slyngstad et al. | 208—210 |
| 3,090,747 | 5/1963 | Slyngstad et al. | 208—210 |

DELBERT E. GANTZ, *Primary Examiner.*

SAMUEL P. JONES, *Examiner.*